Oct. 6, 1931.  K. C. COUNCIL  1,826,459
TOOL HOLDER
Filed May 2, 1929
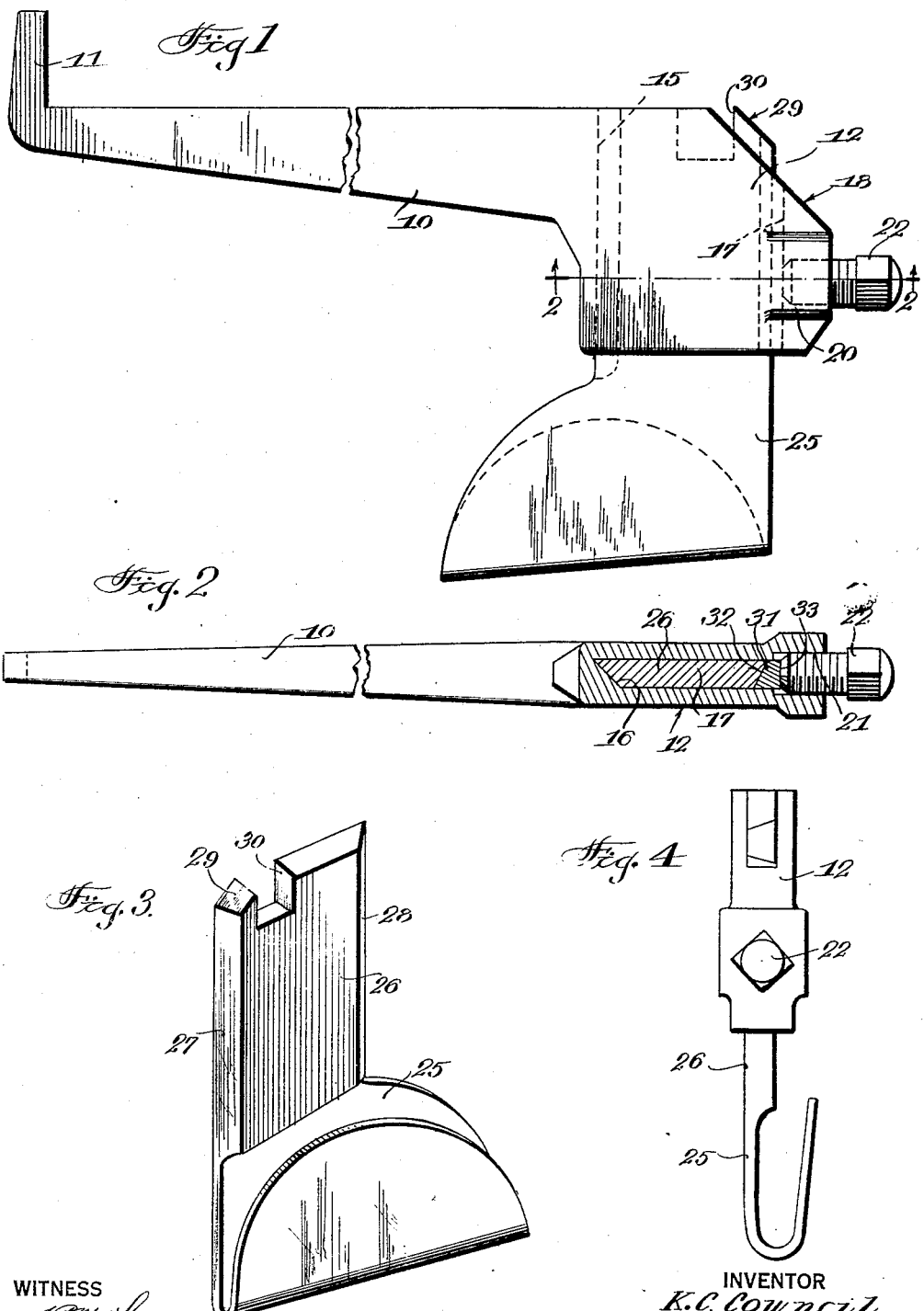

Patented Oct. 6, 1931

1,826,459

UNITED STATES PATENT OFFICE

KINCHEN CLYDE COUNCIL, OF WANANISH, NORTH CAROLINA

TOOL HOLDER

Application filed May 2, 1929. Serial No. 359,982.

This invention relates to a tool holder.

In the construction of those types of tools known in the yellow pine district as hacks and pullers, a tool is welded directly to the shank so that when the tool becomes dull or is broken it will necessitate the replacement of the entire tool.

It is an object of the present invention to provide a tool in which the shank or handle is formed separately from the blade so that it is possible to replace the blades when dull or broken, the blade being so constructed that it may be employed to release a set screw or other securing means for a blade which retains the blade in the holder.

A further object of the invention is the provision of a tool including a holder and a blade removably connected with the holder, the holder having a head provided with a transverse slot to receive the shank of the blade, one wall of the slot being bevelled to receive a bevelled key which is forced in rigid relation with a shank of the blade for not only securing the blade in position but for properly positioning the blade in the handle.

This invention will be best understood from a consideration of the following detailed description, in view of the accompanying drawings forming a part of the specification; nevertheless it is to be understood that the invention is not confined to the disclosure, being susceptible of such changes and modifications which will define no material departure from the salient features of the invention as expressed in the appended claim.

In the drawings:

Figure 1 is a longitudinal side view of a holder and blade constructed in accordance with the principles of my invention, Figure 2 is a horizontal section taken along the line 2—2 of Figure 1, Figure 3 is a view in perspective of the blade adapted to be removably connected in the holder, and Figure 4 is an end view of the tool shown in Figure 1.

Referring to the drawings, 10 designates a shank having a lug 11 at one end and a head 12 at the other end. The shank is fixed to a wooden handle (not shown).

The head 12 has a transverse slot 15 which is disposed approximately at a right angle to the upper edge of the shank 10. One wall of this slot 15 is bevelled, as shown at 16, the other end wall 16 being flat and disposed at right angles to the side walls 17 of the slot. A head 12 is sheared off at an angle at one corner as shown at 18 so that the wall 17 is of less length than the wall 15.

One end of the head 12 is provided with a boss 20 which has a threaded passage 21 opening into the slot 15 in the head. A set screw 22 is threaded into the passage and projects into the slot in the head.

A blade 25 is adapted to be utilized in connection with the head 12 and has a shank portion 26. One side edge of the shank portion is bevelled at 28 to conform to the bevelling of the wall 16 of the slot 15. The outer end of the shank is cut away at 29 and in a manner so that the outer edge of this portion will be parallel to the cut away portion 18 of the head 12. The shank is also provided with a notch 30 which may be used as a wrench to fit the set screw 22 whereby the set screw may be secured in place or released as will be presently explained.

A key 31 has a bevelled edge 32 conforming to the bevelling of the edge 27 of a shank portion 26 of the blade 25. The outer edge of the key 31 is flat and is adapted to engage the flat end 17 of the slot 15 in the head 12.

The tool thus described provides for ready release of blade 25 when the blade has become dull or broken. In this instance the workman carries with him one or more blades to replace the blade in the tool and since each blade has a wrench portion 30, the shank 26 of the blade which is adapted to be placed within the head 12 may be utilized for engaging the head of the set screw 22 for releasing the same.

When the new blade is inserted within the slot 15 of the head 12 the key 31 is inserted in position and the wrench portion 30 of the blade may be utilized for revolving the screw 22 and for securing the parts in position within the head 12.

It is essential that the new blades when placed within the head 12 should have approximately the same position in the head that the old blades have. Due to the bevelling of one end wall of the slot 15 in the bevel 28 of the shank 26 of the blade 25 the shank will be forced rigidly in frictional engagement with the walls of the slot and not only by the set screw 22 but by the key 31 and the complementary bevelling of one edge of the key 31 and the other edge of the shank 26.

I claim:—

A tool holder comprising a shank portion, a head portion provided with a slot disposed at an angle to the handle, one end wall of the slot being beveled, a blade having a shank received by the slot, one edge of the shank being beveled and fitting the beveled wall of the slot, the shank of the blade being of less width than the slot, the opposite edge of said shank being beveled, a key fitted into the slot and having a beveled portion engaging the last mentioned edge of the blade shank, and means for rigidly clamping the key and blade shank against the walls of the slot, a portion of the head being sheared off adjacent a corner of the slot whereby the shank of the blade will project beyond the head so that it will be possible to determine the proper setting of the blade in the head, the free end of the shank being sheared off at the same angle as the head so that the sheared off portions will be substantially parallel.

KINCHEN CLYDE COUNCIL.